United States Patent [19]
Ric ka et al.

[11] Patent Number: 5,359,533
[45] Date of Patent: Oct. 25, 1994

[54] METHOD FOR DETERMINING A FREQUENCY/TIME PROFILE OF HITS, AND DEVICE FOR CARRYING OUT THE METHOD

[75] Inventors: Jaroslav Ric ka, Bern; Max Wüthric, Burgdorf, all of Switzerland

[73] Assignee: ASEA Brown Boveri Ltd., Baden, Switzerland

[21] Appl. No.: 16,457

[22] Filed: Feb. 11, 1993

[30] Foreign Application Priority Data

Apr. 25, 1992 [DE] Fed. Rep. of Germany ....... 4213717

[51] Int. Cl.⁵ ............................................. G01R 23/02
[52] U.S. Cl. .................... 364/484; 364/555; 364/569; 324/76.42; 324/76.47; 324/76.48
[58] Field of Search ........................ 364/484, 569, 555; 324/76.42, 76.47, 76.48

[56] References Cited

U.S. PATENT DOCUMENTS

| | | | |
|---|---|---|---|
| 4,564,918 | 1/1986 | McNally et al. | 364/569 |
| 4,685,075 | 8/1987 | Morita et al. | 364/569 |
| 5,107,439 | 4/1992 | Clark | 364/569 |
| 5,198,750 | 3/1993 | Prokin | 364/569 |
| 5,233,545 | 8/1993 | Ho et al. | 364/569 |

FOREIGN PATENT DOCUMENTS

| | | |
|---|---|---|
| 177058 | 4/1986 | European Pat. Off. . |
| 194744 | 9/1986 | European Pat. Off. . |
| 225023 | 6/1987 | European Pat. Off. . |
| 2038000 | 7/1980 | United Kingdom . |

OTHER PUBLICATIONS

LeCroy Corporation, Research System Division: "1992 Research Instrumentation Catalog", pp. 51-53 1879 Pipeline Multihit Time-to-Digital Converter.

*Primary Examiner*—Thomas G. Black
*Assistant Examiner*—Tyrone V. Walker
*Attorney, Agent, or Firm*—Oblon, Spivak, McClelland, Maier & Neustadt

[57] ABSTRACT

In a method for determining a frequency/time profile of hit sequences and the corresponding device, a measuring window is opened after an external starting signal has been locked. As long as the measuring window is open, the clock periods are counted. If a hit occurs, it is marked with the number of clock periods elapsed up until it occurs, the so-called time mark. The number of hits with this specific time mark determined hitherto is implemented by one. Repeated opening of the measuring window results in a frequency/time profile of the hit sequences due to the fact that, for each value of the time mark, the number of correspondingly marked hits is added together. The hit detection, the hit analysis and the final hit processing all occur in real time for each individual hit in a single measuring step, i.e. the processing of a hit sequence is already concluded immediately after a measuring cycle has elapsed. The number of processable hits per measuring cycle or, respectively, the temporal resolution between two successive hits is exclusively restricted by the time duration between detection and final processing of the individual hits.

3 Claims, 3 Drawing Sheets

METHOD FOR DETERMINING A FREQUENCY/TIME PROFILE OF HITS, AND DEVICE FOR CARRYING OUT THE METHOD

BACKGROUND OF THE INVENTION

1. Field of the Invention

The invention relates to a method for determining a frequency/time profile of hits, and a device for carrying out the method.

In particular, the method and the corresponding device are used in the analysis of the measurement signal of a distributed optical temperature sensor.

A device for carrying out the method according to the preamble of claim 1 is sold by the firm LeCroy under the name "1879 PIPELINE MULTIHIT TIME-TO-DIGITAL CONVERTER" (see LeCroy Corporation, Research System Division: "1992 Research Instrumentation Catalog", page 51–53).

2. Discussion of Background

In distributed optical temperature sensors, a short laser pulse is injected into a multi-mode fiber. From the intensity of the backscattered Raman light as a function of time after the laser pulse, the local temperature distribution in the fiber can be inferred. Because the Raman light is very weak, a large number of such single measurements (measurement cycles) must be averaged.

In addition to analog methods, the so-called photon counting is also suitable for the time-dependent detection of the Raman light. In this method, the time of arrival of a single backscattered photon in a preselected time window (measurement window) is usually determined. Using such a single-photon method, a very good time resolution is achieved (and thus also a good spatial resolution in the temperature measurement. However, because only one photon from the backscattered volume of light is utilized in a measuring cycle and because the processing of the hit still takes a certain time after the time window has elapsed, the measuring time necessary for good averaging of the signal is very long. The measuring time can be shortened by not only a single but the largest possible number of photon hits being processed within one time window.

This requirement is met, for example, in the above-mentioned multihit time-to-digital converter which is sold by LeCroy. In the text which follows, a hit is understood to be the rising or falling edge of a digital signal. Photons can be converted into such signals in a special detection circuit.

The central element of the 1879 PIPELINE MULTIHIT TIME-TO-DIGITAL CONVERTER is a fast shift register. During a measuring cycle, the shift register is filled in such a manner that its content, a series of digital "1" and "0", corresponds to the occurrence in time of the hits to be measured. In the shift register, the time interval, measured from the start of the measuring cycle to the occurrence of a hit, is converted into a binary number. A stop signal ends the measuring cycle. Subsequently, a decision can be made during a pause between measurements where a hit is to be taken into consideration or not. After this pause between measurements, the hits are time coded and read into a memory from where they can be subsequently read out for final processing.

In the measuring instrument mentioned, hit detection, hit analysis and final hit processing take place in succession. First all hits are detected. Only then are all hits analyzed and provided for final processing. The measuring time is long and is 412 μs+approximately 50 ns per hit in this instrument. A new measuring cycle can only be started after the pause between measurements has elapsed. The final processing, i.e. the determination of the frequency/time profile, does not occur during the measurement but only thereafter.

SUMMARY OF THE INVENTION

Accordingly, one object of the invention is to provide a novel method for determining a frequency/time profile of hit sequences in a measuring window (time window) and a device for carrying out the method
  a) which can process several hits during one measuring cycle,
  b) in which the processing time, however, should be as short as possible and, in particular, should not exceed the duration of the measuring window so that the frequency/time profile can be determined in real time without processing-related pauses between measurements.

In the method according to the invention for determining a frequency/time profile of hits, in which
  a) the occurrence in time of several different hits within a measuring window is detected, and
  b) the frequency of the occurrence in time of the hits during a particular number of measuring cycles is determined,
this object is achieved by the fact that,
  c) both the hit detection and the hit analysis and the final hit processing occur in real time,
  d) the number of processable hits per measuring cycle only being limited by the time duration between detection and final processing of the single hits;
  e) after the locking of an external starting pulse with the system clock,
  f) a measuring window is opened, and
  g) the number of clock periods which have passed since the opening of the measuring window is counted;
  h) a hit occurring is locked to the system clock, and
  i) is marked with the number of clock periods passed since the opening of the measuring window, the so-called time mark; and
  k) the number of hits with this specific time mark determined hitherto is incremented by one,
  l) a frequency/time profile of the hit sequences being produced by repeated opening of the measuring window due to the fact that the number of correspondingly marked hits is counted together for each value of the time mark.

An advantage of the method according to the invention lies in that both hit detection and hit analysis and final hit processing occur in real time, that is to say during the measurement and not after the measurement as in the device by LeCroy. As a result, the pauses between measurements due to the processing can be omitted and the total measuring time is considerably shortened.

Furthermore, a device for carrying out the method mentioned above is specified, the device being characterized by
  a) a control unit which preferably comprises a personal computer (PC), for controlling the method,
  b) a multiple time interval analyzer (MTIA) for detection, analysis and processing of the hit sequences and c) a PC interface between the MTIA and the PC which, on the one hand, adapts the signals coming from the PC to the form required by the MTIA and, on the other hand, adapts the signals coming from the MTIA to the form required by the PC, the MTIA comprising the following:

d) two inputs, one of which is a hit input and the other one is a starting pulse input;

e) a clock generator which generates a digital system clock;

f) a starting pulse synchronization circuit, the first input of which is connected to the starting pulse input, and the second input of which is connected to the output of the clock generator, and which locks the starting pulse present at the starting pulse input to the system clock;

g) a start/stop logic, the first input of which is connected to the output of the starting pulse synchronization circuit, and the second input of which is connected to the system clock, and which controls the opening and closing of the measuring window;

h) a time mark counter, the first input of which is connected to the system clock, and the second input of which is connected to the output of the start/stop logic, and which counts the pulses of the system clock for as long as the output of the start/stop logic is active;

i) a hit synchronization circuit, the first input of which is connected to the hit input, and the second input of which is connected to the output of the clock generator, and which locks the hit signal present at the hit input to the system clock;

k) an AND gate, the first input of which is connected to the output of the hit synchronization circuit, and the second input of which is connected to the output of the start/stop logic, and which logically ANDs the two inputs;

l) a time mark register, the load input of which is connected to the output of the AND gate, and the data input of which is connected to the output of the time mark counter, and which, following an active edge of the signal present at its load input, reads in the value present at the output of the time mark counter;

m) a histogram memory, the address input of which is connected to the output of the time mark register, and which delivers the content of the storage location addressed by the address input to its data output;

n) a plus one counter, the data input of which is connected to the data output of the histogram memory, and which increments the value present at its data input by one and writes this value via its data output to the storage location of the histogram memory addressed by the address output of the time mark register;

o) a hit control logic which controls steps d–n; and p) a control logic which controls the data and address flow from and to the PC interface.

In the device according to the invention, the storage location allocated to a hit is incremented during the measurement. Thus, the formation of the histogram (final processing) takes place during the measurement.

It is thus the core of the invention to specify a method for determining a frequency/time profile of hits and a corresponding device, in which method both the hit detection and the hit analysis and the final hit processing occur in real time during the measurement.

The arrangement according to the invention is especially distinguished by the fact that the entire processing of a sequence of several hits including the storage occurs in real time and does not exceed the duration of the measuring window. This drastically reduces the total measuring time.

Naturally, the application of the method according to the invention and of the corresponding device is not restricted to distributed temperature sensors but can be used wherever frequency/time profiles of hits must be measured.

Further advantageous embodiments are obtained from all the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
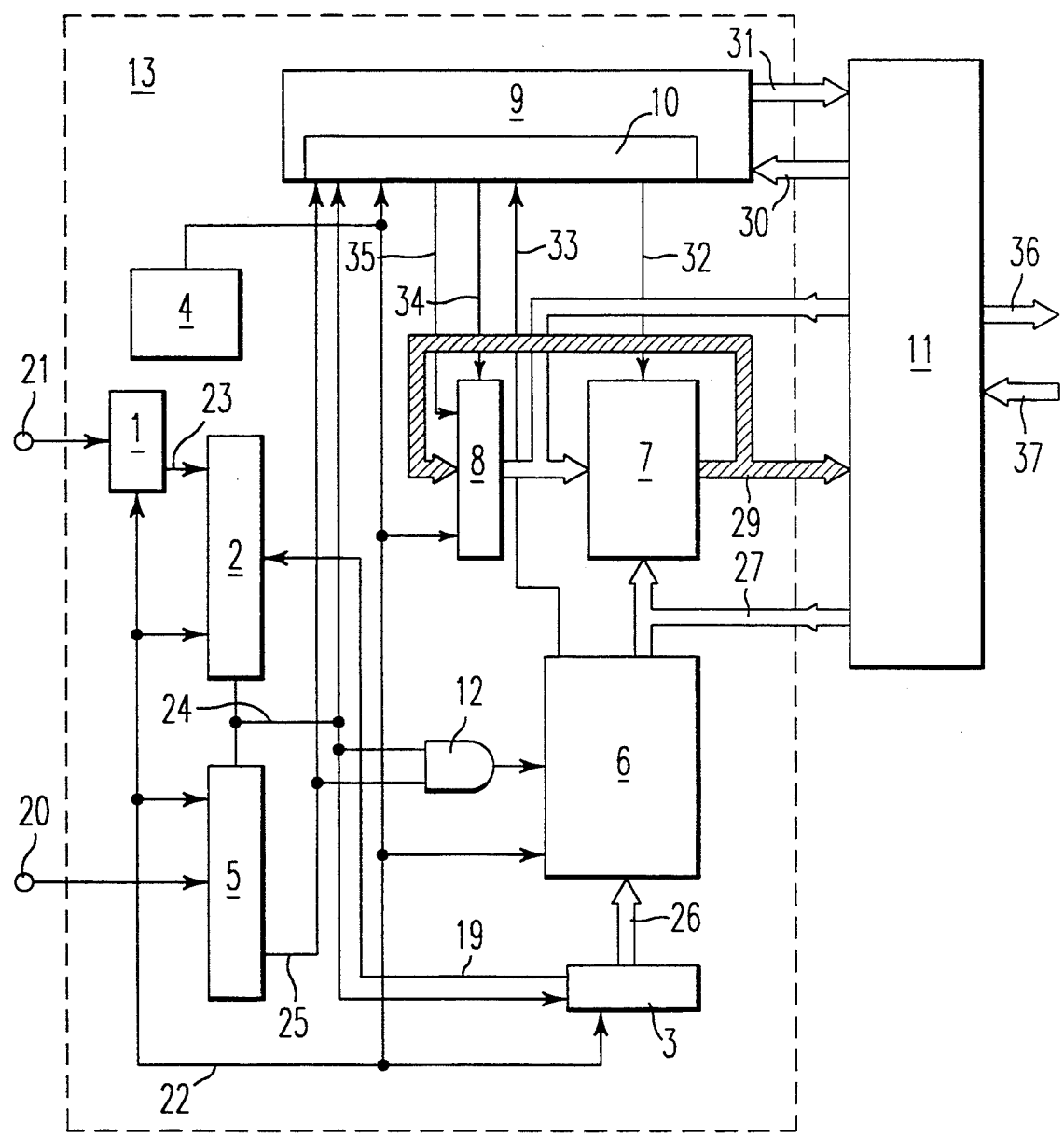
FIG. 1 shows a block diagram of a device according to the invention.

Referring now to the drawings, wherein like reference numerals designate identical or corresponding parts throughout the several views, a measuring window is opened after the locking of an external starting signal in the method according to the invention. As long as the measuring window is open, the clock periods are counted. If a hit occurs, it is marked with the number of clock periods elapsed up to its occurrence, the so-called time mark. The number of hits with this specific time mark hitherto determined is incremented by one. Repeated opening of the measuring window results in a frequency/time profile of the hit sequences due to the fact that the number of correspondingly marked hits is added together for each value of the time mark.

Both the hit detection and the hit analysis and the final hit processing take place in a single step for each individual hit and not only after the detection of all hits has been concluded. In other words, the three steps are executed in real time.

The number of processable hits per measuring cycle, or the temporal resolution between two successive hits, the so-called pulse pair resolution, is exclusively restricted by the time duration between detection and final processing of a single hit.

In a preferred embodiment of the method according to the invention, there is the possibility of opening the measuring window only after a certain delay time has elapsed. Thus, it is possible to compensate for example for any transient times in a detection unit which are normally not zero.

Figure 2:
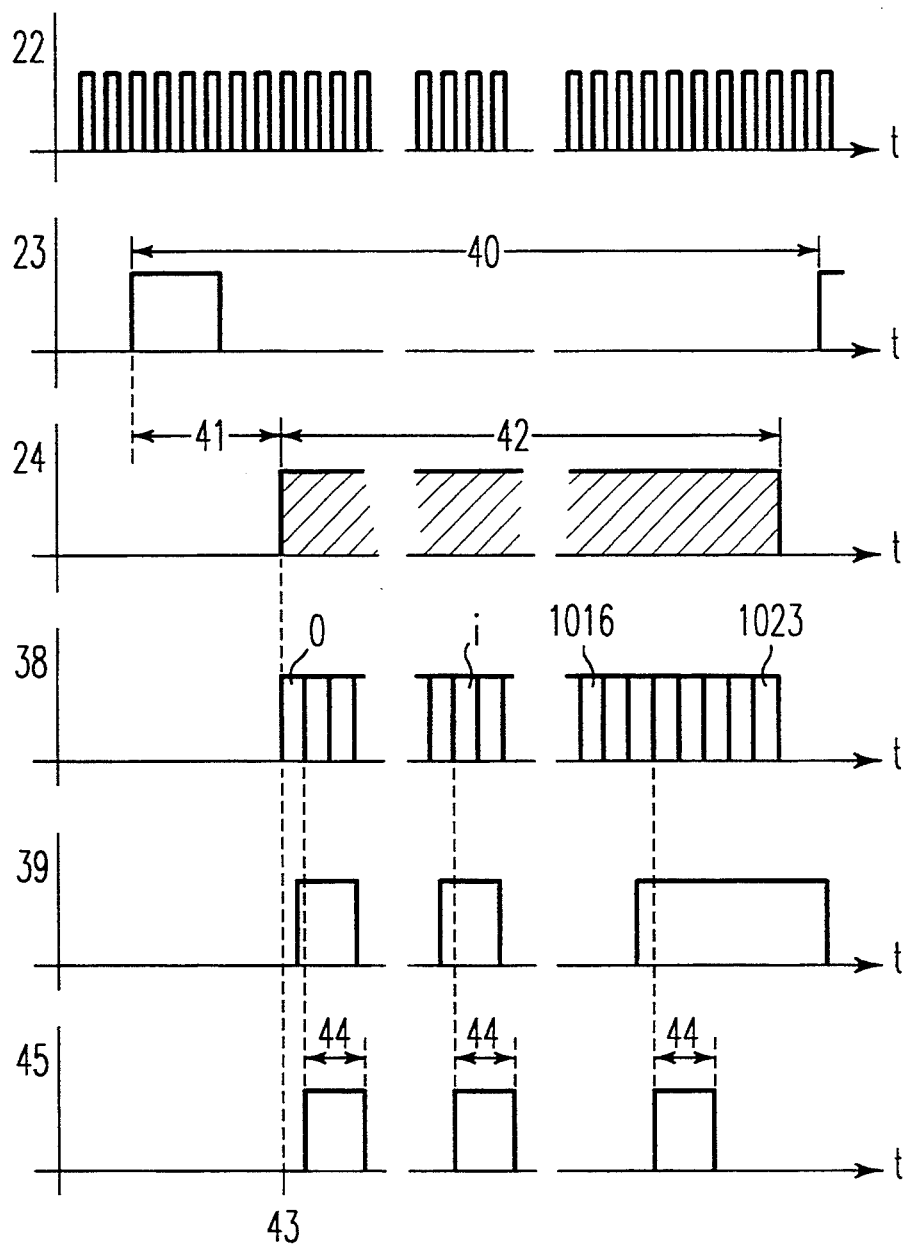
FIG. 2 shows a timing diagram of the method according to the invention.
Figure 3:
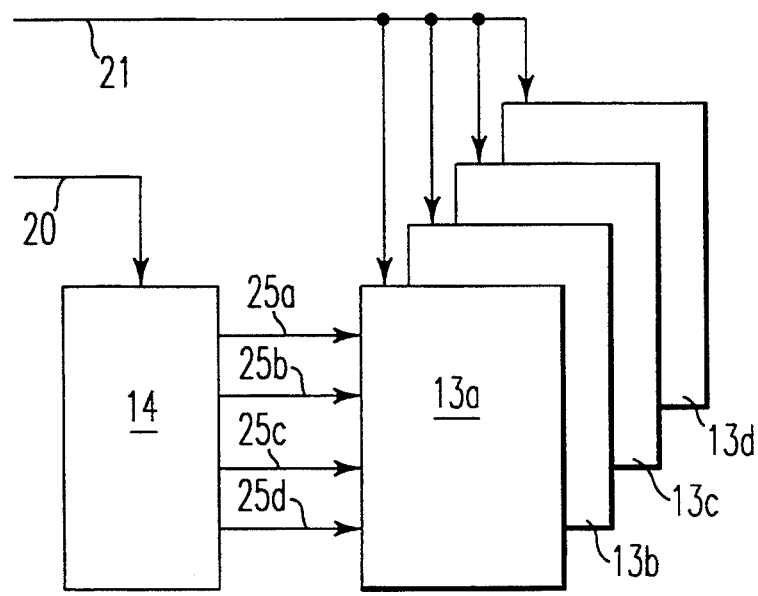
FIG. 3 shows an application of the device according to the invention for increasing the temporal resolution.

FIGS. 1 and 2 will now be used for explaining the relationship between the method according to the invention explained above and the device according to the invention. The device according to the invention comprises a control unit, preferably a personal computer (PC) which is connected to a multiple time interval analyzer (13) via a PC interface (11). The multiple time interval analyzer (13) will be called MTIA for short in the text which follows. Capital letters will designate signals in the text which follows while normally written designations stand for the corresponding function blocks.

The MTIA (13) has two inputs, a starting pulse input (21) and a hit input (20). Both are in each case connected to a synchronization circuit (1, 5). The starting pulse is input (21) to the starting pulse synchronization (1), the hit input (20) to the hit synchronization (5). In these two synchronization circuits (1, 5), the asynchronous signals STARTING PULSE and KIT are locked to the system clock (22). The system clock (22) is generated in the clock generator (4) and provides the clock for the MTIA (13). All control and timing tasks are controlled in the manner known by the person skilled in the art by the hit controller (10) and do not require any further explanation. The same applies to the communication between the PC interface (11) and the MTIA (13) which is controlled in the usual manner in the field by the control logic (9).

If then a starting pulse is applied for the input (21) of the starting pulse synchronization circuit (1), the start/stop logic (2) causes the measuring window, represented by the corresponding control signal (MEASURING WINDOW, 24), to be opened after a delay where applicable. MEASURING WINDOW (24) is also connected to the time mark counter (3). The latter begins to count the number of clock periods as long as MEASURING WINDOW (24) is active. If then a hit occurs at the hit input (20), the signal is locked (25) to the system clock (22) and is logically ANDed with the MEASURING WINDOW (24) in the AND gate (12). Thus, the output of the AND gate (12) is only "1" as long as both MEASURING WINDOW (24) and KIT (25) are "1". This ANDed signal can be used as a load instruction for the time mark register (6). The time mark register (6) reads in the current time mark count as soon as "1" occurs at its load input.

The output of the time mark register (6) is connected to the address input of the histogram memory (7) and thus addresses the storage location which corresponds to the time mark register content, i.e. the number of elapsed clock periods. The value which is stored at this storage location is then read out and forwarded to the plus one counter (8). This adds one to the value present at its input and forwards this value incremented by one to the data input of the histogram memory (7). This new value is written back to the same location since, of course, the address is still present in the time mark register (6). During the process explained above, any further hits are ignored since otherwise the address of the histogram memory (7) would be changed. This temporary inhibit is provided by the hit controller (10).

As long as the measuring window is open, the storage locations which were addressed by the hit-specific number of clock periods are incremented by one. Thus a frequency/time profile is obtained by repeated opening and closing of the measuring window.

The MTIA (13) is connected to the PC via a PC interface (11). From the PC, the system can be programmed and controlled. The PC interface (11) converts the data coming from the PC into data, addresses and instructions for the MTIA (13). Similarly, the signals are also brought into a form readable by the PC in the PC interface (11) by the MTIA (13). Communication with the PC interface (11) takes place from the MTIA (13) via the control buses or CONTROL IN (30) and CONTROL OUT (31) and the data buses DATA IN (28) and DATA OUT (29) and the address bus (27). The two control buses (30, 31) are connected to the control logic (9). The data bus DATA IN (28) is connected to the output of the plus one counter (8) and the data input of the histogram memory (7). The data output of the histogram memory (7) is connected to the PC interface (11) via the data bus DATA OUT (29). The address bus (27) connects the output of the time mark register (6) and the address input of the histogram memory (7) to the PC interface.

FIG. 2 shows the variation with time of the method according to the invention and, respectively, the timing diagram of the device according to the invention.

After a particular delay time (41), if appropriate, the measuring window (24) is opened following a starting pulse (23). This time is used as a time reference (43). At the same time, the time mark counter (3) begins to count the time marks (38). The time marks run from 0 to 1023. If, for example, a hit (39) occurs during the first clock period, this is locked (i.e. detected) and marked by the number "1" (i.e. analyzed). This locked and marked hit is then finally processed during the processing time (44) as explained. During this time (44), no other hits are accepted temporarily. The exact same steps occur in a case of the hits with time mark "i" or "1019". At the end of time mark 1023 (38), the measuring window (24) is closed. Between the opening and the closing of the measuring window, the time (42) has elapsed. Immediately after the closing of the measuring window (24), the window can be opened again by another starting pulse (23). This repeated opening and closing of the measuring window (24) with the period (40) finally provides the desired frequency/time profile.

In a first preferred embodiment of the device according to the invention, the time mark counter (3) comprises a (K+1)-bit binary counter. After the opening of the measuring window, it counts from 0 to $2^K-1$. The (K+1)th bit (19) is connected to the start/stop logic (2) and, as a control bit, is used for closing the measuring window at the end of the last, i.e. $(2^K-1)$th, clock period. The time mark register (6) correspondingly comprises a K-bit register. The histogram memory (7) correspondingly comprises a $(2^K \times D)$ RAM and the plus one counter (8) comprises a binary D-bit counter which can be loaded in parallel, D designating the word length of the data.

In a second preferred embodiment of the device according to the invention, the time mark register (6) exists several times. As a result, new hits can be detected while the last hit is being processed. If the multiple time mark register consists of R individual K-bit registers, hit sequences consisting of a maximum of R new hits can be detected during the hit processing. The temporal resolution of two hits, which is only limited by the processing time of one hit, can be lowered by this special embodiment of the time mark register (6).

In a third preferred embodiment of the device according to the invention, several MTIAs (13a–d) are used in parallel. They are clocked with deferred system clocks. A preceding hit distribution unit (14) distributes the hits (25a–d) to the MTIAs (13a–d). Such an arrangement can be used for increasing the temporal resolution of the entire system. Connecting four MTIAs in parallel, for example, corresponds to quartering the system clocks and thus to a temporal resolution which is four times higher.

The advantages of the method according to the invention and of the corresponding device will be demonstrated by means of a numerical example.

In an implemented version, the hit processing, i.e. the addressing of the memory, the reading-out, incrementation and reloading of the memory takes a maximum of 44 ns. The pulse pair resolution is thus also 44 ns. If the system is clocked with a 250 MHz clock, a temporal resolution of 4 ns is obtained. Thus, the measuring window is open for $(2^{10}) \times 4$ ns=4 ls with a 10-bit time mark register. Thus, 90 hits can be detected, analyzed and processed during the total processing time of 4 ls. If the system is expanded by the variants explained as preferred embodiments, both the processing time of 44 ns and the temporal resolution of 4 ns are reduced and thus the number of processable hits is also increased. Additional expansions are achieved by increasing the number of channels K or the word length D.

Overall, the method according to the invention and the corresponding device thus exhibit a much shorter processing time. The system can be easily expanded. At the same time, the temporal resolution and the pulse pair resolution can be improved while at the same time reducing the processing time.

Obviously, numerous modifications and variations of the present invention are possible in light of the above teachings. It is therefore to be understood that within the scope of the appended claims, the invention may be practised otherwise than as specifically described herein.

What is claimed as new and desired to be secured by Letters Patent of the United States is:

1. A device for determining a frequency/time profile of hits, comprising:
   a) a control unit comprising a personal computer (PC);
   b) a multiple time interval analyzer (MTIA) for detection, analysis and processing of hit sequences; and
   c) a PC interface between the MTIA and the PC, which adapts signals coming from the PC to a form required by the MTIA and which adapts signals coming from the MTIA to a form required by the PC, the MTIA comprising:
   d) two inputs, a first input being a hit input and a second input being a starting pulse input;
   e) a clock generator which generates a digital system clock;
   f) a starting pulse synchronization circuit, having a first input connected to the starting pulse input, and having a second input connected to an output of the clock generator, and which locks the starting pulse present at the starting pulse input to the system clock;
   g) a start/stop logic, having a first input connected to an output of the starting pulse synchronization circuit, and having a second input connected to the system clock, and which controls opening and closing of a measuring window;
   h) a time mark counter, having a first input connected to the system clock, and having a second input connected to an output of the start/stop logic, and which counts the pulses of the system clock for as long as the output of the start/stop logic is active, wherein the time mark counter comprises a (K+1)-bit binary counter which, after an opening of the measuring window, counts from 0 to $2^K-1$, the (K+1)th bit being connected to the start/stop logic and causes the start/stop logic to close the measuring window;
   i) a hit synchronization circuit, having a first input connected to the hit input, and having a second input connected to the output of the clock generator, and which locks the hit signal present at the hit input to the system clock;
   k) an AND gate, having a first input connected to an output of the hit synchronization circuit, and having a second input connected to the output of the start/stop logic, and which logically ANDs the two inputs;
   l) a time mark register, having a load input connected to an output of the AND gate, and having a data input connected to an output of the time mark counter, and which, following an active edge of the signal present at the load input, reads in the value present at the output of the time mark counter, which time mark register comprises a K-bit register;
   m) a histogram memory, having an address input connected to an output of the time mark register, and which delivers a content of a storage location addressed by the address input to its data output, the histogram memory comprising a $(2^K \times D)$-bit RAM, D designating a word length of the data;
   n) a plus one counter, having a data input connected to the data output of the histogram memory, and which increments the value present at its data input by one and writes this value via its data output to the storage location of the histogram memory addressed by the address output of the time mark register, the plus one counter comprising a binary D-bit counter which can be loaded in parallel
   o) a hit control logic which selects function blocks in accordance with steps d)–n); and
   p) a control logic which controls data and address flow from and to the PC interface.

2. The device as claimed in claim 1, wherein
   a) the time mark register comprises R individual K-bit registers and a register logic which is connected between the output of the AND gate and the R individual K-bit registers,
   b) the register logic selecting the individual K-bit registers in such a manner than R−1 further hits can still be detected during the processing of one hit, which
   c) increases the temporal resolution between two hits.

3. The device as claimed in either one of claims 1 or 2, wherein as higher temporal resolution is achieved by the fact that several MTIAs are used in parallel, which are clocked with deferred system clocks, the hits being distributed to the various MTIAs by means of a hit distribution unit preceding the MTIAs.

* * * * *

UNITED STATES PATENT AND TRADEMARK OFFICE
CERTIFICATE OF CORRECTION

PATENT NO. : 5,359,533
DATED : October 25, 1994
INVENTOR(S) : Jaroslav RICKA, et al.

It is certified that error appears in the above-indentified patent and that said Letters Patent is hereby corrected as shown below:

On the title page, Item [19] and Item [75], the inventorship should read:

Item [19] --Ricka et al.--

Item [75] Inventors:

--Jaroslav Ricka, Bern; Max Wüthrich, Burgdorf, all of
     Switzerland--

Signed and Sealed this

Thirty-first Day of January, 1995

Attest:

BRUCE LEHMAN

Attesting Officer

Commissioner of Patents and Trademarks